(12) United States Patent
Van Poucke

(10) Patent No.: US 11,589,606 B1
(45) Date of Patent: Feb. 28, 2023

(54) APPARATUS AND METHODS FOR MAKING FOOD PRODUCTS WITH IMPROVED HEATING COMPONENTS

(71) Applicant: Ideal Snacks Corporation, Liberty, NY (US)

(72) Inventor: Steven Van Poucke, Monroe, NY (US)

(73) Assignee: BFY Brands, LLC, Wilmington, DE (US)

( * ) Notice: Subject to any disclaimer, the term of this patent is extended or adjusted under 35 U.S.C. 154(b) by 101 days.

(21) Appl. No.: 16/524,685

(22) Filed: Jul. 29, 2019

Related U.S. Application Data

(63) Continuation-in-part of application No. 16/411,769, filed on May 14, 2019, now abandoned.

(51) Int. Cl.
*A23P 30/36* (2016.01)
*A23P 30/10* (2016.01)

(52) U.S. Cl.
CPC .............. *A23P 30/36* (2016.08); *A23P 30/10* (2016.08)

(58) Field of Classification Search
None
See application file for complete search history.

(56) References Cited

U.S. PATENT DOCUMENTS

| | | | |
|---|---|---|---|
| 2,151,535 A * | 3/1939 | Scurlock | A47J 37/10 126/390.1 |
| 3,231,718 A * | 1/1966 | Paulv | A47J 36/2483 219/450.1 |
| 3,958,032 A | 5/1976 | Merriam | |
| 3,978,236 A | 8/1976 | Sair et al. | |
| 5,067,323 A | 11/1991 | Bennett | |
| 5,102,677 A | 4/1992 | Van Den Berghe | |
| 5,271,728 A | 12/1993 | Froidevaux | |
| 5,467,693 A | 11/1995 | Van den Berghe | |
| 5,660,098 A | 8/1997 | Van den Berghe | |
| 6,153,242 A | 11/2000 | Miyamoto et al. | |
| 6,248,379 B1 | 6/2001 | Capodieci et al. | |
| 6,333,063 B2 | 12/2001 | Ariga et al. | |
| 6,468,573 B1 | 10/2002 | Herrick et al. | |
| 6,569,481 B1 | 5/2003 | Malfait | |
| 6,607,777 B1 | 8/2003 | Walsh et al. | |
| 6,632,465 B1 | 10/2003 | Malfait | |

(Continued)

FOREIGN PATENT DOCUMENTS

| | | |
|---|---|---|
| GB | 2502110 | 11/2013 |
| JP | 2004098580 | 4/2004 |

(Continued)

OTHER PUBLICATIONS

International Search Report and Written Opinion issued in PCT/US2020/032597 dated Aug. 5, 2020.

(Continued)

*Primary Examiner* — Ibrahime A Abraham
*Assistant Examiner* — Elizabeth M Kerr
(74) *Attorney, Agent, or Firm* — Barnes & Thornburg LLP; G. Peter Nichols

(57) ABSTRACT

Apparatus and methods for making puffed food products are disclosed. In one implementation, an innovative process, apparatus, or system may employ at least one base mold with a defined pattern of one or more surface cavities carved therein in order to more evenly or uniformly distribute heat to raw ingredients or an intermediate food product during baking step(s).

15 Claims, 11 Drawing Sheets

(56) References Cited

U.S. PATENT DOCUMENTS

| | | | |
|---|---|---|---|
| 7,135,201 B2 | 11/2006 | Malfait | |
| 7,521,078 B2 | 4/2009 | Miller | |
| 7,597,921 B2 | 10/2009 | Walsh et al. | |
| 7,666,460 B1 | 2/2010 | Keogh | |
| 7,770,513 B2 * | 8/2010 | Van Poucke | A23P 30/32 99/349 |
| 7,918,157 B2 * | 4/2011 | Van Den Berghe | A23P 30/36 99/372 |
| 8,161,871 B2 | 4/2012 | Van Poucke | |
| 8,191,467 B2 | 6/2012 | Van Poucke | |
| 8,227,005 B2 | 7/2012 | Van Poucke | |
| 11,191,294 B1 * | 12/2021 | Van Poucke | A21B 5/00 |
| 2003/0215642 A1 | 11/2003 | Carre et al. | |
| 2013/0125767 A1 * | 5/2013 | Shoshan | A23L 13/03 99/441 |
| 2013/0251877 A1 * | 9/2013 | Levin | A23L 19/19 426/450 |
| 2015/0359249 A1 | 12/2015 | Matasovsky et al. | |
| 2018/0366363 A1 * | 12/2018 | Ngo | B05C 13/02 |

FOREIGN PATENT DOCUMENTS

| | | |
|---|---|---|
| WO | 2009/137171 | 11/2009 |
| WO | 2016/176107 | 11/2016 |

OTHER PUBLICATIONS

International Preliminary Report on Patentability dated Nov. 16, 2021 in PCT/US2020/032597.

\* cited by examiner

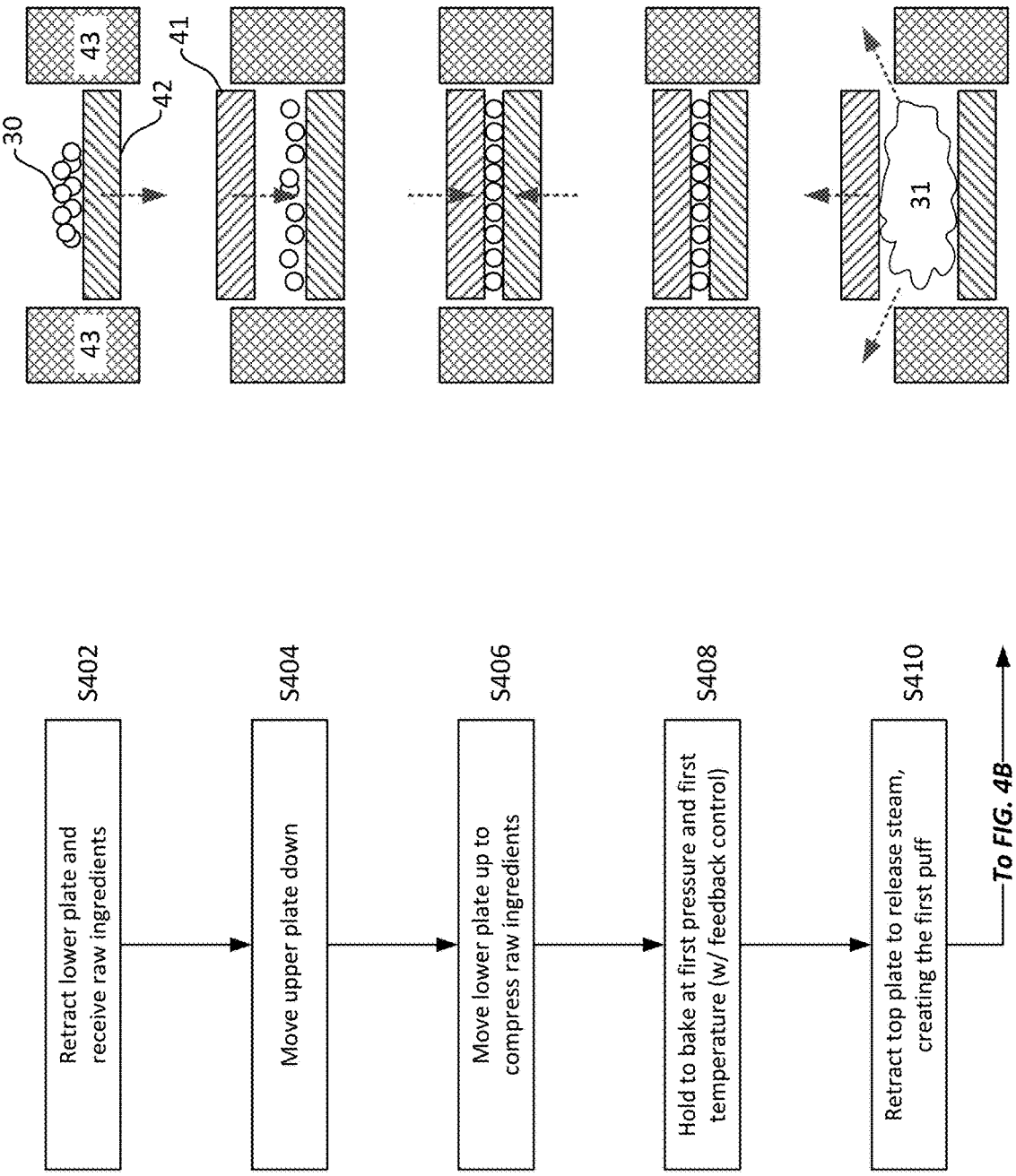

APPARATUS AND METHODS FOR MAKING FOOD PRODUCTS WITH IMPROVED HEATING COMPONENTS

CROSS-REFERENCE TO RELATED APPLICATIONS

The present application is a continuation-in-part of, and claims the benefit of, U.S. Utility application Ser. No. 16/411,769, titled "MULTIPLE-PRESS, MULTIPLE-EXPANSION APPARATUS AND METHODS FOR MAKING FOOD PRODUCTS," which was filed on May 14, 2019. The present application also relates to U.S. Utility application Ser. No. 10/504,444 (now U.S. Pat. No. 7,770,513), filed Aug. 12, 2004, which is a national stage application under 35 U.S.C. § 371 from PCT Application No. PCT/EP02/01674, filed Feb. 15, 2002. Each of the above-referenced related applications is incorporated herein by reference in its entirety.

FIELD

The present innovations generally relate to the manufacture of food products, and more particularly, are directed to apparatus and methods for making puffed food products with improved heating components.

BACKGROUND

In the past few decades, a strong trend emerged in the food industry to develop more nutritious and more healthy snacks. Health-conscious consumers increasingly demand food products that include lower fat content, offer more balanced amounts of protein and carbohydrates, or are generally more health-promoting than traditional snacks such as candies, chips, crackers, and the like. As a result, the food industry has attempted to tackle the challenges of making wholesome snack food products out of conventional or alternative ingredients and with less fat or sugar while maintaining or improving the taste and texture of such food products.

In the trend of healthy snacking, puffed snacks have become more and more popular due to their inherent lightness, crispy texture, and ability to accommodate flavoring. As one example, automatic machines for the making of rice crackers and similar puffed or popped granular cakes by pressure-baking and expanding a food-starch containing material in a heated mold are known from the prior art to exist in a number of distinct machine variants.

The present inventor previously disclosed an apparatus and related methods for making puffed food products from starch-containing raw materials. See U.S. Pat. No. 7,770,513.

Referring to FIGS. 1A-1D, a prior-art sequence of mold position steps in the process of producing a puffed cereal wafer or cracker are shown. The mold comprises an upper mold 1 and a lower mold 2, both heatable by means of embedded heating elements (not represented) and movable upwardly and downwardly by being directly driven by hydraulic cylinders as illustrated and explained below. Upper and lower molds generally have punch elements (1', 2') which are slidably receivable in a ring mold 3 (preferably fixed but not always required) so as to form therewith a hermetically sealed molding cavity. In FIG. 1A the mold cavity is open, the lower mold 2 has been partially retracted within ring mold 3 while upper mold 1 is lifted, such that a food-starch containing raw material 4 may be dropped into the mold cavity.

FIG. 1B shows pressure-baking of raw material 4. The raw material 4 is crushed, compressed, and heated in a closed cavity by descending the upper mold into the ring mold and then pressurizing either one or both of upper and lower molds. The starch in the raw material is gelatinized, becomes amorphous, and moisture including chemically bound water of the raw material is driven off to build up a high internal vapor pressure.

The built-up vapor pressure is then suddenly released as shown in FIG. 1C by quickly retracting upper and/or lower punches relative to one another within the ring mold. As a result, the compressed raw material explosively expands to form a puffed or popped wafer filling the expansion chamber space defined between the upper mold, the lower mold, and the ring mold.

As shown in FIG. 1D the upper mold is in a lifted position again, whereas the lower punch is moved in the upward direction to raise the cracker to a discharge position flush with the upper surface of the ring mold. A sliding plate of the raw material feed system (not shown) can then push the puffed cracker from the raised lower mold surface into a discharge chute whereafter the baking-puffing cycle can start anew.

In FIGS. 2A-2B, overall side views of a prior-art puffing apparatus are shown comprising a multi-cracker mold, i.e., the upper and lower molds (1, 2) include a plurality of die punches (1', 2') which are slidably receivable in a plurality of corresponding die holes (not shown) of a stationary ring mold 3. Lateral to the apparatus there is mounted a raw material supply system 6 comprising a raw material supply line 7 (conduit or hopper) and sliding plates (8, 8') having suitable perforations and back plates to supply a desired amount of grain or pellet material to each die cavity of the ring mold. Power means (9, 9', 9"), e.g., air cylinders drive the plates in sliding movements relative to one another and to the ring mold. More in particular, a dosage mechanism (8') driven by cylinder (9') brings an exact amount of raw material from supply line (7') into a transport plate (8). The transport plate (8) is driven by cylinder (9) and positions the raw material precisely over each lower punch element (2') being then in a cup-forming feed position, i.e., received partly within ring mold openings (3'). Release plate (8") driven by cylinder (9") is then actuated to drop or release raw material from transport plate (8) into the ring mold cups or cavities.

On the back side of each movable mold, i.e., on top of upper mold 1 and at the bottom of lower mold 2, there is mounted an upper hydraulic cylinder 10 and a lower drive cylinder 11 respectively, both independently actionable in the respective upward and downward direction to raise or descend the mold elements over a precisely controlled distance and/or to transmit molding pressure to the raw material in the mold cavity according to the desired process stages.

Mounting plates (10', 11') attached to apparatus frame (12) form support and fixation members for top and bottom hydraulic cylinders (10, 11) and also bear and guide the connection thereof with the movable mold elements (1, 2). The hydraulic cylinders are powered by a hydraulic oil circuit.

The prior-art process for making puffed food products is illustrated in the flow chart in FIG. 3 with the following steps: (S1) Cup Time: bottom cylinder retracts (goes down), and retracted punches of lower mold form feeding cups within ring mold dies to allow raw material to be dropped into the mold; (S2) Start Time: top cylinder extends (goes down), and upper mold punch goes down inside ring mold die; (S3) Press Time: bottom cylinder extends, and lower mold punch is displaced upwardly, compressing the raw material between the two punches; (S4) Bake Time: all valves remain closed, while both cylinders and punches are kept stationary; (S5) Top Expansion: top cylinder retracts; (S6) Bottom Expansion: bottom cylinder retracts (mostly) simultaneously with top cylinder; (S7) Expansion Delay: delay time of expanded/puffed product inside the retracted punches or expansion-opened molds to allow shape control of finished product; (Optional) Thickness Control: bottom cylinder extends and recompresses already expanded product to a given extent, thereby controlling shape, thickness and surface flatness; (S8) Out Time: top cylinder retracts upper mold above ring mold, and bottom cylinder extends, so that lower mold punch pushes finished product out of ring mold. Thereafter, the cycle starts anew with Step S1 including the supply of starch-containing raw material into the mold cavities.

While the above-described prior-art technique has seen some commercial success in producing puffed food products, various new improvements on the method and/or apparatus are desirable in order to make the production more efficient, to ensure consistent and uniform quality, and to accommodate unique characteristics of a wide variety of ingredients or raw materials, for example.

SUMMARY OF THE INVENTION

Embodiments of the present invention make significant improvements upon prior-art techniques for making puffed food products. In one implementation, an innovative process, apparatus, or system may employ at least one base mold with a defined pattern of one or more surface cavities carved therein in order to more evenly or uniformly distribute heat to raw ingredients or an intermediate food product during baking step(s).

According to one particular embodiment of the present invention, a pressure-molding apparatus for making a food product may comprise: at least one heatable mold which defines a mold cavity and has at least one movable mold element; a driving system, coupled to the at least one mold element, that is configured to move the at least one mold element relative to the mold cavity; at least one base mold, coupled to or as part of said at least one heatable mold, that has at least one surface cavity of a defined geometry configured to promote a uniform distribution of heat across said at least one base mold; a raw material supply system that transports raw materials into the mold cavity; and a control unit configured to control at least one of said driving system, said at least one heatable mold, and said raw material supply system to process said raw material into a puffed food product.

According to another particular embodiment of the present invention, a system for making a food product may comprise one or more pressure-molding apparatuses, where each of the pressure-molding apparatuses may include: at least one heatable mold which defines a mold cavity and has at least one movable mold element; a driving system, coupled to the at least one mold element, that is configured to move the at least one mold element relative to the mold cavity; at least one base mold, coupled to or as part of said at least one heatable mold, that has at least one surface cavity of a defined geometry configured to promote a uniform distribution of heat across said at least one base mold; a raw material supply system that transports raw materials into the mold cavity; and a control unit configured to control at least one of said driving system, said at least one heatable mold, and said raw material supply system to process said raw material into a puffed food product.

According to yet another particular embodiment of the present invention, a method for making a food product may comprise the steps of: (a) depositing a raw material into a mold cavity in at least one heatable mold, said mold comprising at least one movable mold element; (b) positioning said at least one movable mold element with respect to said mold cavity to compress said raw material; (c) baking said compressed raw material in said mold at a first temperature; (d) at least partially retracting said at least one movable mold element to allow said baked, compressed raw material to expand and take shape into a first intermediate food product; (e) re-positioning said at least one movable mold element with respect to said mold cavity to compress said first intermediate food product; (f) baking said first intermediate food product in said mold at a second temperature; and (g) at least partially retracting said at least one movable mold element to allow said baked, compressed first intermediate food product to expand and take shape into a second intermediate food product. The method may further comprise attaching at least one base mold to, or as part of, said at least one heatable mold, said at least one base mold having at least one surface cavity of a defined geometry configured to promote a uniform distribution of heat across said at least one base mold, and wherein at least one of Steps (c) and (f) comprises baking with said at least one base mold coupled to at least one heater plate.

Other benefits, advantages, or technical effects may be appreciated by those of ordinary skill in the art reading the disclosure herein and/or by practicing one or more embodiments of the present invention.

BRIEF DESCRIPTION OF THE DRAWINGS

The accompanying appendices, drawings, figures, images, etc. illustrate various exemplary, non-limiting, inventive aspects, embodiments, and features ("e.g.," or "example(s)") in accordance with the present disclosure:

FIGS. 4A-4B show a flow chart illustrating an exemplary method for making puffed products and corresponding diagrams illustrating core components for implementing the method according to embodiments of the present invention;

DETAILED DESCRIPTION OF THE INVENTION

Embodiments of the present invention aim to build upon, and make significant improvements over, the above-described prior-art techniques for making puffed food products. In particular, while the inventor previously suggested an optional "Thickness Control" step of compressing the food item after an initial expansion, embodiments of the present invention teach a second press or compression coupled with a second heating/baking and expansion to more optimally configure the shape, moisture content, and texture of the final food product. The second cycle of compression, baking, and expansion may be controlled based on precisely measured and adjusted baking temperatures and/or compression pressures. According to further embodiments, a third cycle (or more) of compression, baking, and expansion may be added.

Figure 4B:
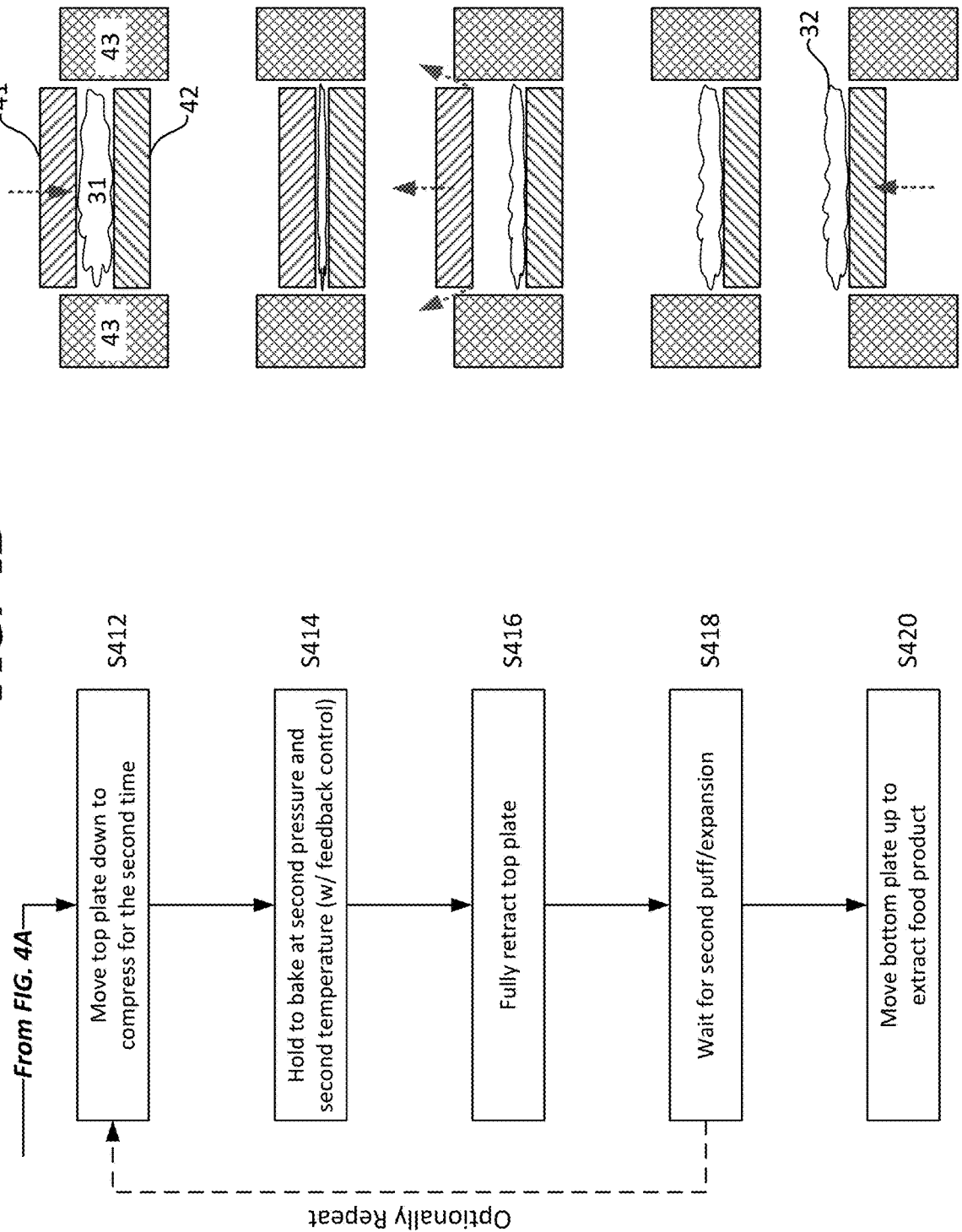

Referring to FIGS. 4A-4B, there are shown both a flow chart illustrating an exemplary method for making puffed food products and corresponding diagrams illustrating core components for implementing the method according to embodiments of the present invention.

In the illustrative diagrams, the cross-sectional view of a ring mold element 43 is shown along with an upper mold plate 41 and a lower mold plate 42 in respective positions depending on the corresponding steps or stages of the manufacturing process. It should be noted that these simplified illustrations of mold elements are intended to assist in the explanation of the numbered steps or stages of the exemplary food-making process; the present invention is not limited to the use of such mold elements or their exemplary configurations as shown in these drawings.

In Step S402, the lower plate 42 may be retracted in the ring mold element 43 to form a feed cup (or a hermetically sealed molding cavity) such that an appropriate amount of raw ingredients 30 may be deposited.

According to embodiments of the present invention, the raw ingredients may be or include one or more of the following: wheat, rye, maize (corn), rice, sago, sorghum, triticale, millet, beans, potatoes, or starches from these or similar sources. According to other embodiments, the raw ingredients may alternatively or additionally include protein-rich food materials or protein therefrom. Other alternative ingredients may include one or more of the following: whole pieces of beans and peas, such as green and yellow peas, black bean, garbanzo bean, chick peas; whole seeds, such as sesame, quinoa, and chia; extruded pellets, such as soy-based protein pellets, pellets containing dried fruits, and vegetable pellets made from spinach, carrots, or beet etc.

Figure 1A:
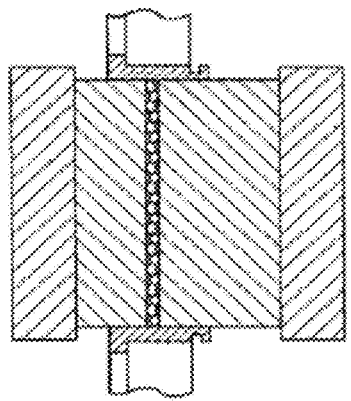
FIGS. 1A-1D are schematic illustrations of the main steps occurring in a prior-art process of making a puffed cracker using a stationary ring mold and respective upper and lower movable mold elements or punches.
Figure 1B:
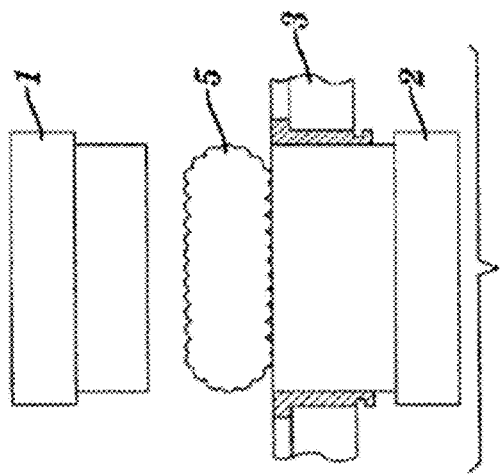
Figure 1C:
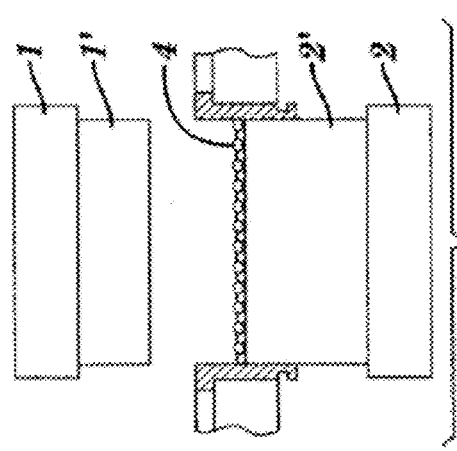
Figure 1D:
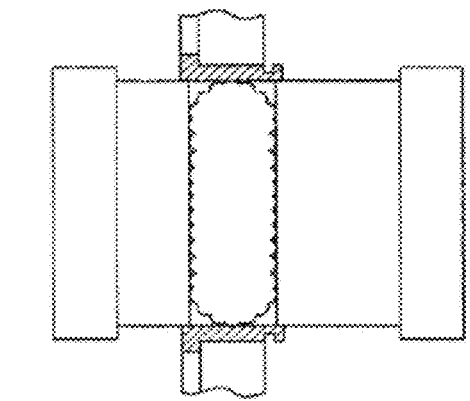
Figure 2A:
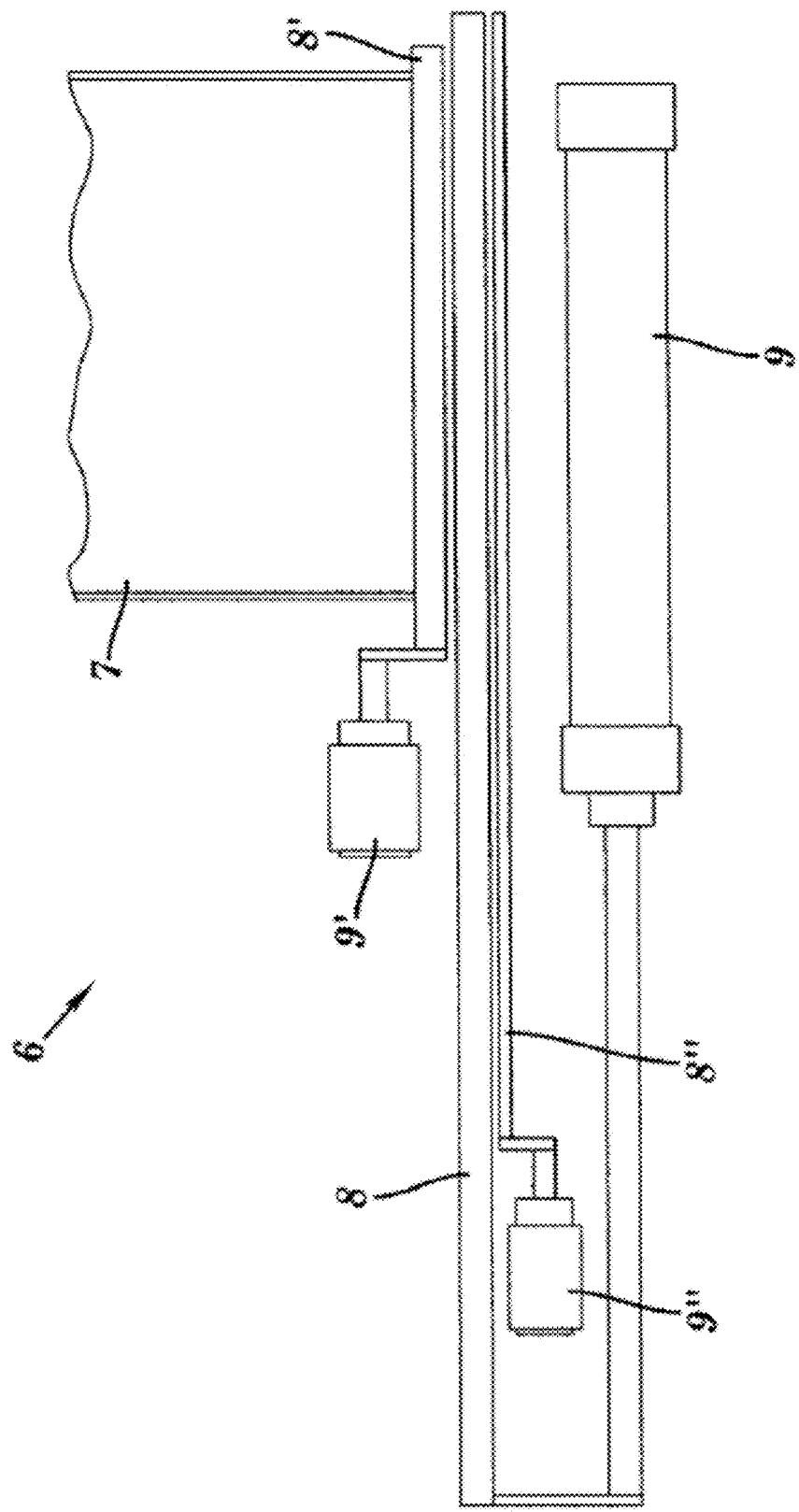
FIGS. 2A-B give side views of a puffing machine arrangement for carrying out the prior-art process steps according to FIGS. 1A-1D.

The raw ingredients 30 may be deposited (e.g., injected, dropped, slided) into the temporarily formed feed cup by the raw material supply system 6 shown in FIG. 2A or with a similar mechanism. The raw ingredients may have been pre-processed, such as chopped or ground to powder or granular forms and/or mixed with condiments, before being supplied to the feed cup. According to one embodiment of the present invention, pre-processing or preparation of the raw ingredients may include pre-heating them to a desired temperature, such as a temperature closer to a subsequent baking temperature than to room temperature. Other examples of pre-processing may include steaming of the raw ingredients which may modify the starch content and add moisture thereto. Apart from addition of moisture, the raw ingredients may be pre-processed to remove moisture.

Figure 2B:
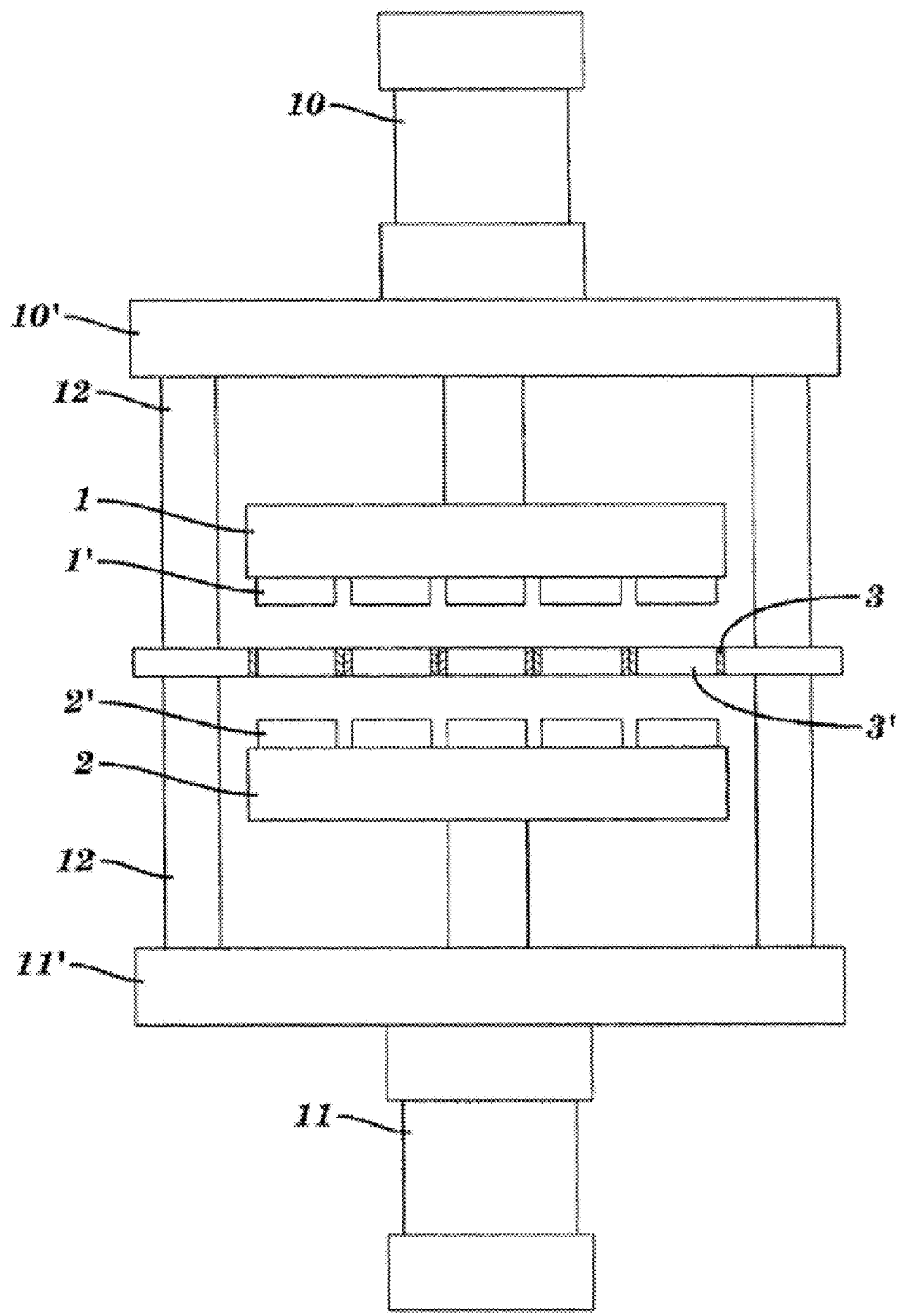
Figure 3:
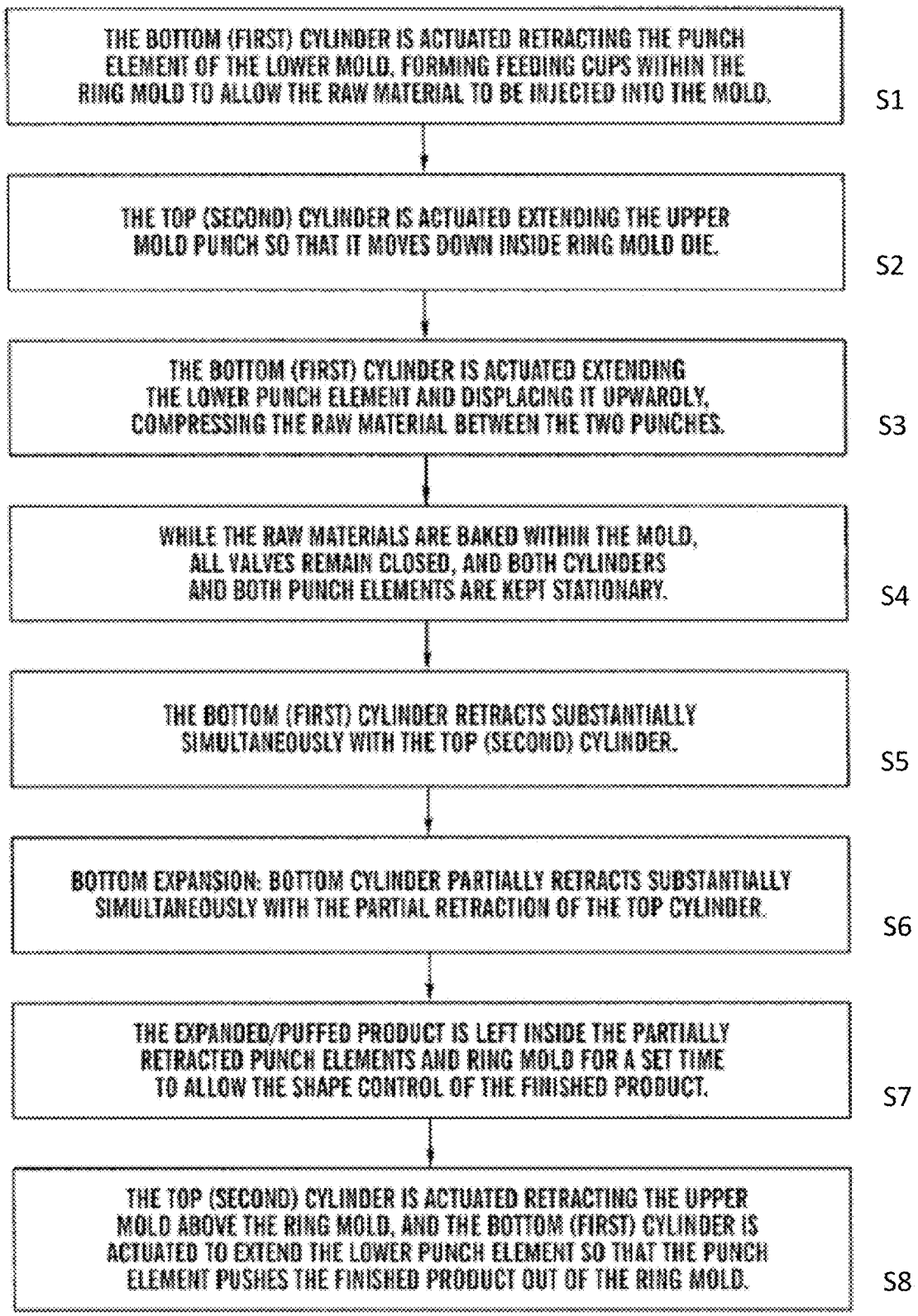
FIG. 3 shows a flow chart illustrating a prior-art process for making puffed products.

Retraction of the lower plate 42 may be achieved through any of a variety of actuation means. For example, the lower plate 42 may be coupled to, and directly driven by, at least one hydraulic cylinder such as shown in FIG. 2B and in more detail in FIGS. 5A-5B described below. The extent of the lower plate 42's retraction may depend on the amount of the raw ingredients 30: if the raw ingredients require more space inside the feed cup, then the lower plate 42 should be lowered further or deeper within the ring mold 43.

In Step S404, the upper plate 41 may be moved down towards the lower plate 42 which has the raw ingredients 30 thereon.

Figure 5A:
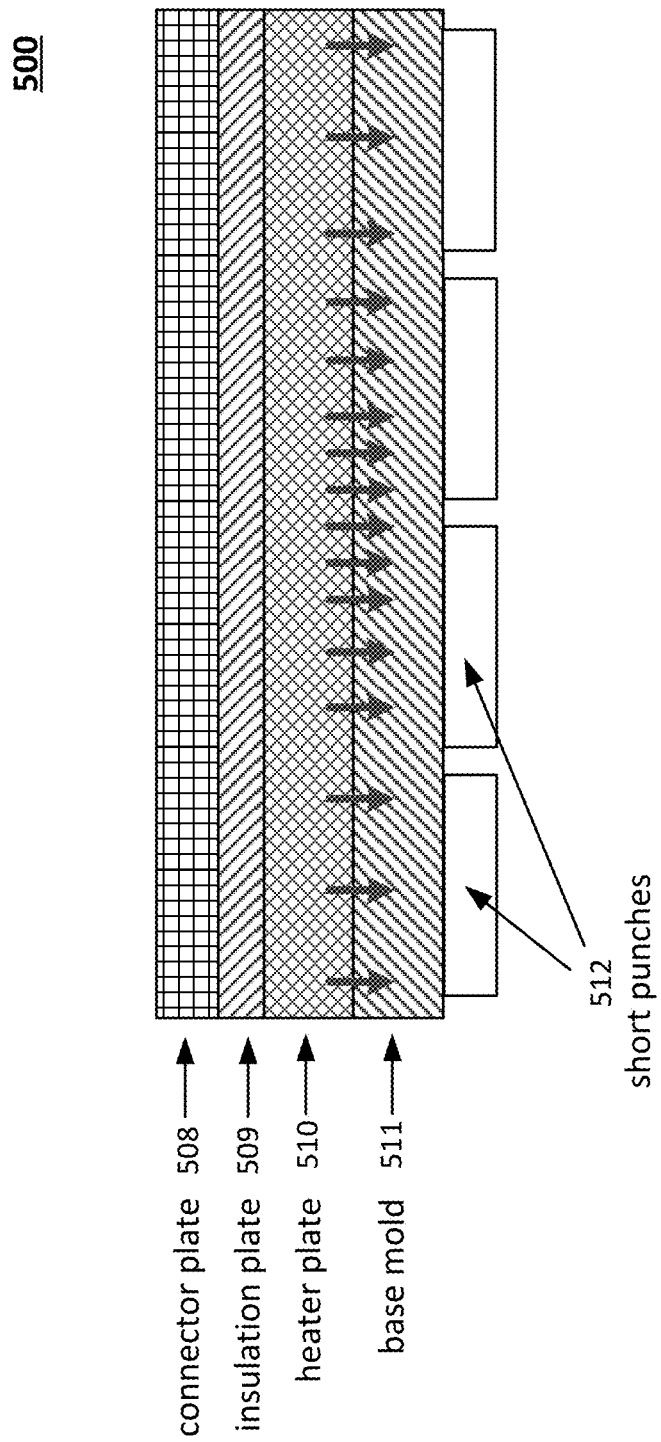
FIGS. 5A-5B show a cross-sectional view of components of an exemplary heatable mold in accordance with embodiments of the present invention.
Figure 5B:
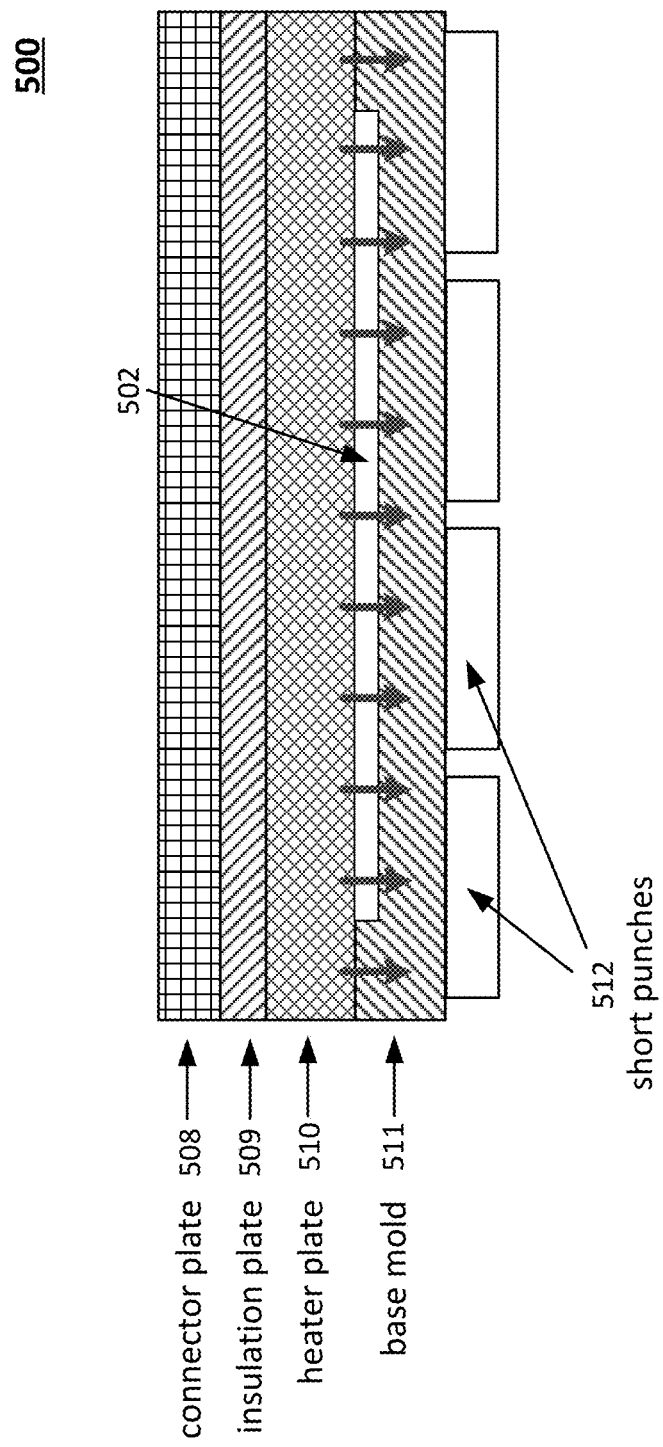

Similar to the movement of the lower plate 42, the upper plate 41 may be moved through any of a variety of actuation means. For example, the upper plate 41 may also be coupled to, and directly driven by, at least one hydraulic cylinder such as shown in FIG. 2B and FIGS. 5A-5B.

In Step S406, the lower plate may be moved up at substantially the same time as (or before or after) the lowering of the upper plate 41 in Step S404. As a result, the raw ingredients may be spread between and compressed by the upper and lower plates. According to some embodiments of the present invention, the pressure applied by the two mold plates may be controlled by coordinating their respective actuation means such as hydraulic pressures of corresponding driving cylinders.

Then, in Step S408, the mold plates 41 and 42 are held in place and heated in order to bake the raw ingredients 30 at a first pressure and a first temperature.

According to embodiments of the present invention, the mold plates 41 and 42 may be heated to desired temperature(s) based on a number of methods. For example, heating elements may be attached to or embedded within the mold plates 41 and 42 respectively and dynamically controlled based on precise measurements of their surface temperatures. Real-time sensing of the mold plates' surface temperatures may allow continuous, precise adjustments of the heating elements' thermal inputs to the raw ingredients.

The duration of the baking in Step S408 may be a fixed number of seconds, for example, based on empirical data obtained from processing the same raw ingredients. Alternatively, the baking may be ended based on detection of changes in temperature and/or pressure in or near the mold cavity. For example, the detected onset of more rapid increase in temperature and/or the plateauing of pressure increase might provide the cue to end or wind down Step S408.

The baking temperature, duration, and applied pressure may have significant effects on the moisture level and texture of the resulting food product. According to some embodiments of the present invention, temperatures of the mold plates may vary generally between 200 and 320° C., and more preferably between 220 and 260° C.; while the baking duration may vary generally from 0.25 to 10 seconds, and more preferably between 1.0 and 2.5 seconds. The limits to the baking temperature and time are chosen to prevent under-cooking and over-cooking (or burning) of the ingredients; and the multiple-press concept according to embodiments of the present invention widens these limits significantly. For example, while a certain product will burn after being baked at 230° C. for 2 seconds, it may be possible to bake the same product at 230° C. three times for one second each time. The latter (multi-press) process may create an end product with a crispier texture and lower moisture content. Due to the very short baking time, the pressure applied to the mold plates becomes important, including both the amount of pressure, the duration of the pressure, and the speed at which the pressure is applied. Therefore, according to some embodiments, it may be desirable to equip each apparatus or related hydraulic system with a flow control valve (e.g., with a needle-controlled orifice) in order to adjust the application of pressure more precisely.

Next, in Step S410, the top plate 41 may be retracted (i.e., raised) to open up the mold cavity. In the alternative or in addition, the lower plate 42 may be retracted (i.e., lowered) to achieve a same or similar effect. The mold plate movement(s), creating more space in the mold cavity, release the steam or vapor suddenly from the mold cavity, thereby causing the now baked raw ingredients to rapidly expand.

According to some embodiments of the present invention, the retraction of one or both mold plates may be controlled such that the expansion of the baked raw ingredients is essentially unconstrained by the dimensions of the mold cavity. That is, the mold plate(s) may be retracted far enough and fast enough so as to allow the expansion to reach its maximum extent possible. According to other embodiments, the mold plate(s) need not be retracted so far or so fast as to permit the fullest possible expansion. Instead, the mold plate retraction may only permit the expansion to a fraction (e.g., ⅓, ½, or ¾) of its full potential. According to some embodiments, Step S410 may be configured to allow some dwell time in order to allow the desired amount of expansion to be achieved.

At the end of Step S410, the raw ingredients 30 have been converted (through compression, baking, and expansion) into a first intermediate food product 31.

In Step S412, the top plate 41 may again be moved down relative to the lower plate 42 (or vice versa) to compress the first intermediate food product 31. As a result, the puffed shape of the first intermediate food product 31 may be substantially flattened.

In one alternative embodiment of the present invention, additional ingredients, condiments, and/or flavoring may be optionally added to the mold cavity during Step S412. In another alternative embodiment, the upper plate 41 may be replaced by another upper plate of a different shape or surface profile or modified by an attachment to achieve a same or similar effect.

In Step S414, the mold plates 41 and 42 may be held in place and heated in order to bake the now compressed, first intermediate food product 31 at a second pressure and a second temperature.

Similar to Step S408, the mold plates 41 and 42 may be heated to desired temperature(s) based on a number of methods, such as the use of heating elements attached to or embedded within the mold plates 41 and 42 respectively and dynamically controlled based on real-time feedback. The duration of the baking in Step S414 may similarly be either a fixed amount based on empirical data or dynamically determined based on detection of changes in temperature and/or pressure in or near the mold cavity. Typically, the second baking duration and pressure may be different from corresponding parameters for the previous baking step (S408).

In Step S416, the top plate 41 may be fully retracted (i.e., raised) to allow release of additional steam or vapor from the mold cavity, thereby causing the now compressed and baked first intermediate food product 31 to expand.

In Step S418, the process may be paused for a period of time (e.g., a few seconds) to allow the first intermediate food product 31 to fully expand and take a final shape.

At the end of Step S418, the first intermediate food product 31 have been converted (through the second cycle of compression, baking, and expansion) into a final food product 32.

According to alternative embodiments of the present invention, what is produced at the end of Step S418 may be merely a second intermediate food product. Optionally, the process may loop back to Step S412 to repeat at least one more cycle of compression, baking, and expansion to the second intermediate food product before yielding a final food product 32.

As mentioned above, a third cycle or additional cycles may, among other things, extend the limits of temperature, time, and pressure and offer more flexibilities and capabilities for processing a wide variety of raw ingredients and for achieving final food products of desired characteristics. For example, some whole beans and grains cannot be crushed sufficient in a single press, while a multiple-press method may transform those ingredients more fully—which may be especially important for the creation of baby food. With the ability to compress and bake the ingredients multiple times, the final food product may have a crispier texture, adopt a different shape/profile, and contain less harmful microscopic organisms.

Finally, in Step S420, the bottom plate 42 may be moved up for extraction of the final food product 32. For example, the bottom plate 42 may be raised to be flush with (or slightly above) the top surface of the ring mold 43, whereupon the final food product 32 may be pushed or blown off into a discharge chute or another collection receptacle.

At the completion of Step S420, the process may loop back to Step S402 to retract the lower plate 42 and start another round of making puffed food products.

As may be appreciated by those skilled in the art, the steps of the exemplary process may be at least partially automated with electronically controlled components and/or a microprocessor, microcontroller, or microcomputer. For example, an apparatus according to an embodiment of the present invention may include a control unit coupled to a driving system, a raw material supply system, and at least one heatable mold having at least one movable mold element connected to the driving system. The control unit may preferably be programmable to electronically control the raw material supply system to input ingredients into the heatable mold, to cause the driving system to position the at least one moveable mold element, and to bake the ingredients and/or intermediate product(s), all according to the process steps illustrated in FIGS. 4A-4B.

As may be appreciated by those skilled in the art, each diagram of mold elements corresponding to a method step shown in FIGS. 4A-4B represents one production unit of a mold assembly in a larger manufacturing apparatus such as partially shown in FIGS. 2A and 2B.

It should be noted that the mold assemblies shown in the drawings are exemplary only and many of their aspects may be designed or configured differently to accommodate manufacturing needs for different ingredients and final food products. For example, although the upper and lower punch elements or mold plates are shown as having flat food-contacting surfaces in parallel to each other, they can have other surface profiles and/or relative configurations, such as grooves or slots, concave, convex, or wavy contours, or complementary profiles. In addition, the ring dies may have other, non-circular shapes such as triangle, hexagon, octagon, square, or rectangle. Or, the punch elements and ring dies may be easily replaced with components having the alternative designs. Exemplary shapes of the mold plates and ring dies may include but are not limited to: French fries, gold fish, star, tear drop, cloud, heart, oval, and dog bone.

According to a particular implementation, the driving system 50 may comprise: a fluid reservoir 52; a pump 54; a feed line 56 connected to the pump 54 and the fluid reservoir 52; a return line 58 connected to the fluid reservoir; at least one hydraulic cylinder $C_1$, $C_2$ connected to the feed line 56 and to the return line 58, the hydraulic cylinder $C_1$, $C_2$ being connected to and moving said at least one movable mold element 41, 42 into and out of the mold cavity; a plurality of valves including at least one feed valve 62a, 62b connected in the feed line 56 and at least one return valve 64a, 64b connected in the return line 58; and a unit that controls the operation of the feed 62a, 62b and return 64a, 64b valves to control the flow of fluid to the hydraulic cylinder $C_1$, $C_2$ and back to the reservoir 52.

During the process of making food products, such as the exemplary multiple-press, multiple-expansion process described above, it is desirable to heat or bake the food items uniformly and consistently, such that parts of the same food item and different food items of the same or different batches have substantially the same taste and texture. This requires that the raw ingredients and any intermediate food products be evenly cooked or baked by the heatable mold and individual mold elements.

FIGS. 5A-5B show a cross-sectional view of components of an exemplary heatable mold 500 in accordance with embodiments of the present invention. The mold 500 may correspond to the upper mold 1 and upper punch elements 1' shown in FIG. 2B; or the mold 500 may correspond to the lower mold 2 and lower punch elements 2' shown in FIG. 2B.

Shown with more detail here in FIGS. 5A-5B, the mold 500 may comprise a connector plate 508 which couples the mold 500 to a driving system (e.g., a hydraulic cylinder/piston not shown here). The mold 500 may also comprise a heater plate 510 and an insulation plate 509 separating the heater plate 510 from the connector plate 508 (to provide thermal insulation between the connector plate 508 and the heater plate 510). The heater plate 510 may be heated up to desired temperatures, such as through electrical means, during baking steps of a food production process. The heat from the heater plate 510 may be transferred to a base mold 511 (attached to the heater plate 510), as indicated by the downward arrows, and then to short punches 512 (attached to the base mold 511), thereby baking the raw ingredients or intermediate food product in contact with or near the short punches 512.

With the orientation shown in FIGS. 5A-5B, the mold 500 may serve as an upper mold or a part thereof (e.g., 1 and 1' in FIG. 2B or 41 in FIGS. 4A-4B). However, if it is rotated 180 degrees with the short punches 512 facing upward, then the mold 500 may serve as a lower mold or a part thereof (e.g., 2 and 2' in FIG. 2B or 42 in FIGS. 4A-4B).

The inventor has discovered that, when a flat and smooth base mold 511 is used (as shown in FIG. 5A), there tends to be more heat transferred to the center region of the base mold 511 than to its peripheral regions, which results in uneven baking of the food product in contact with or near the short punches 512. This may be due to the faster heat dissipation in the peripheral regions of the heater plate 510 and the base mold 511 than in the center region. In order to achieve a more uniform heat transfer from the heater plate 510 to the base mold 511 and/or a more even temperature distribution across the base mold 511, the inventor discovered that a shallow cavity or surface cavity (502) of a defined geometry may be cut into the base mold 511 (on the top side where it contacts the heater plate 510) to promote uniformity in heat distribution across the base mold 511, as is shown in FIG. 5B.

Figure 6:
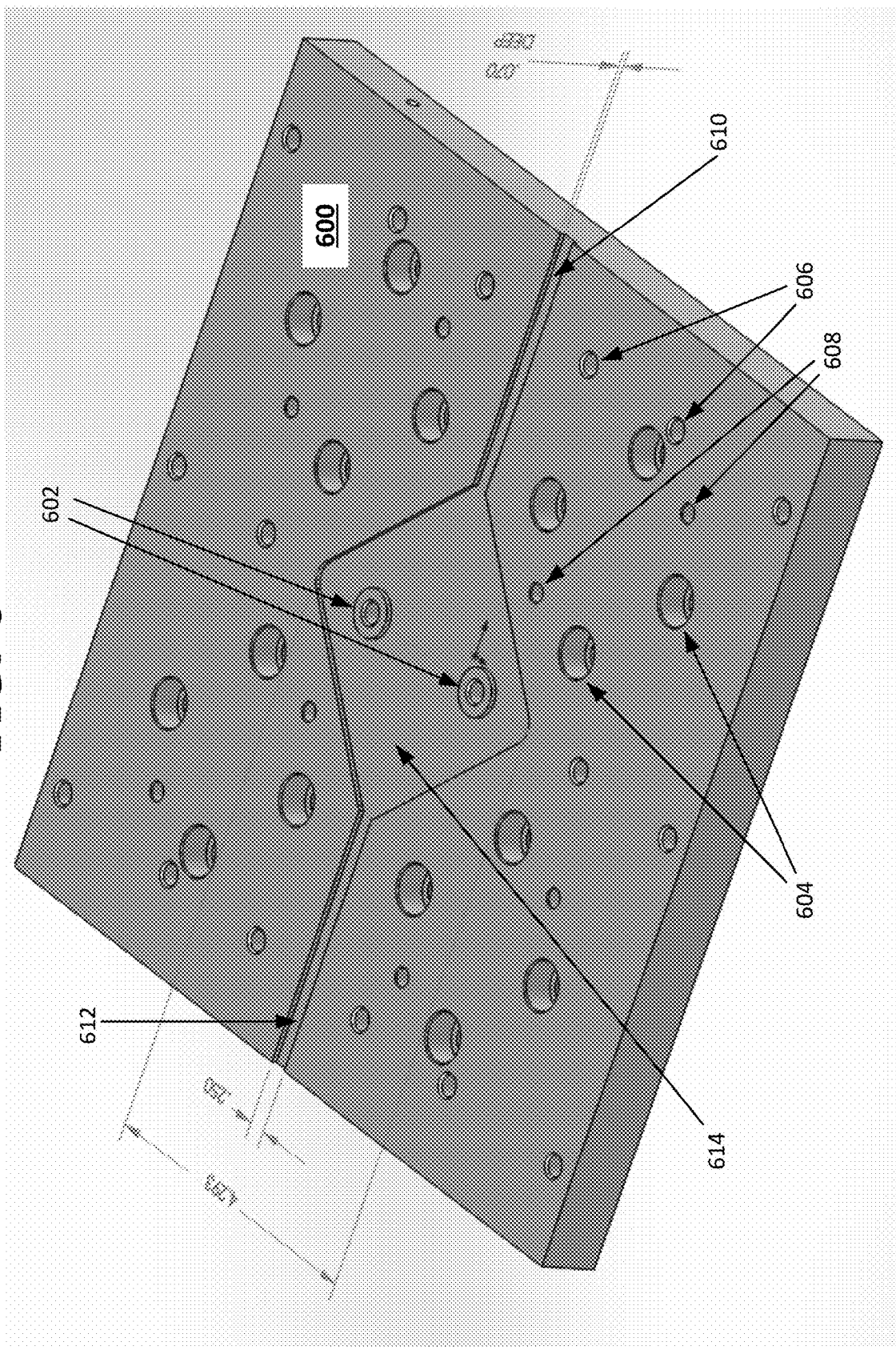
FIG. 6 shows one exemplary base mold of a heatable mold in accordance with an embodiment of the present invention.

FIG. 6 shows one exemplary base mold 600 of a heatable mold in accordance with an embodiment of the present invention.

The base mold 600 may include various features for attachment to punch elements and/or insulation plate, such as bolt openings 602 and 604, anchoring holes 606 and 608. A surface cavity 614 of a diamond shape is created in the base mold 600. In this example, the length of a diagonal of the diamond-shaped surface cavity 614 may be 4.293 inch; and its depth may be 0.070 inch. The surface cavity may extend to opposite sides of the base mold 600 by way of 0.250 inch wide trenches 610 and 612.

Figure 7:
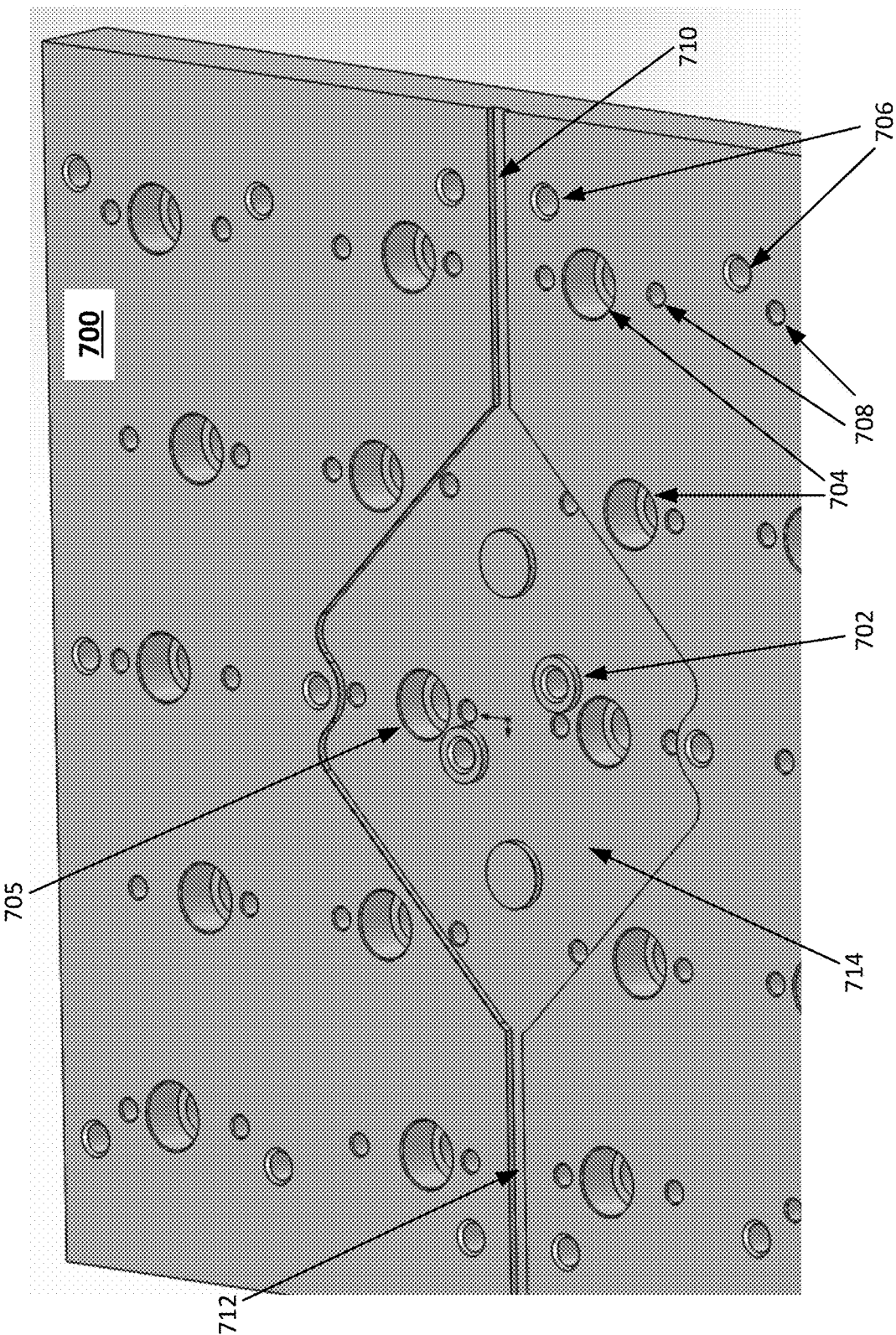
FIG. 7 shows part of another exemplary base mold of a heatable mold in accordance with an embodiment of the present invention.
Figure 8:
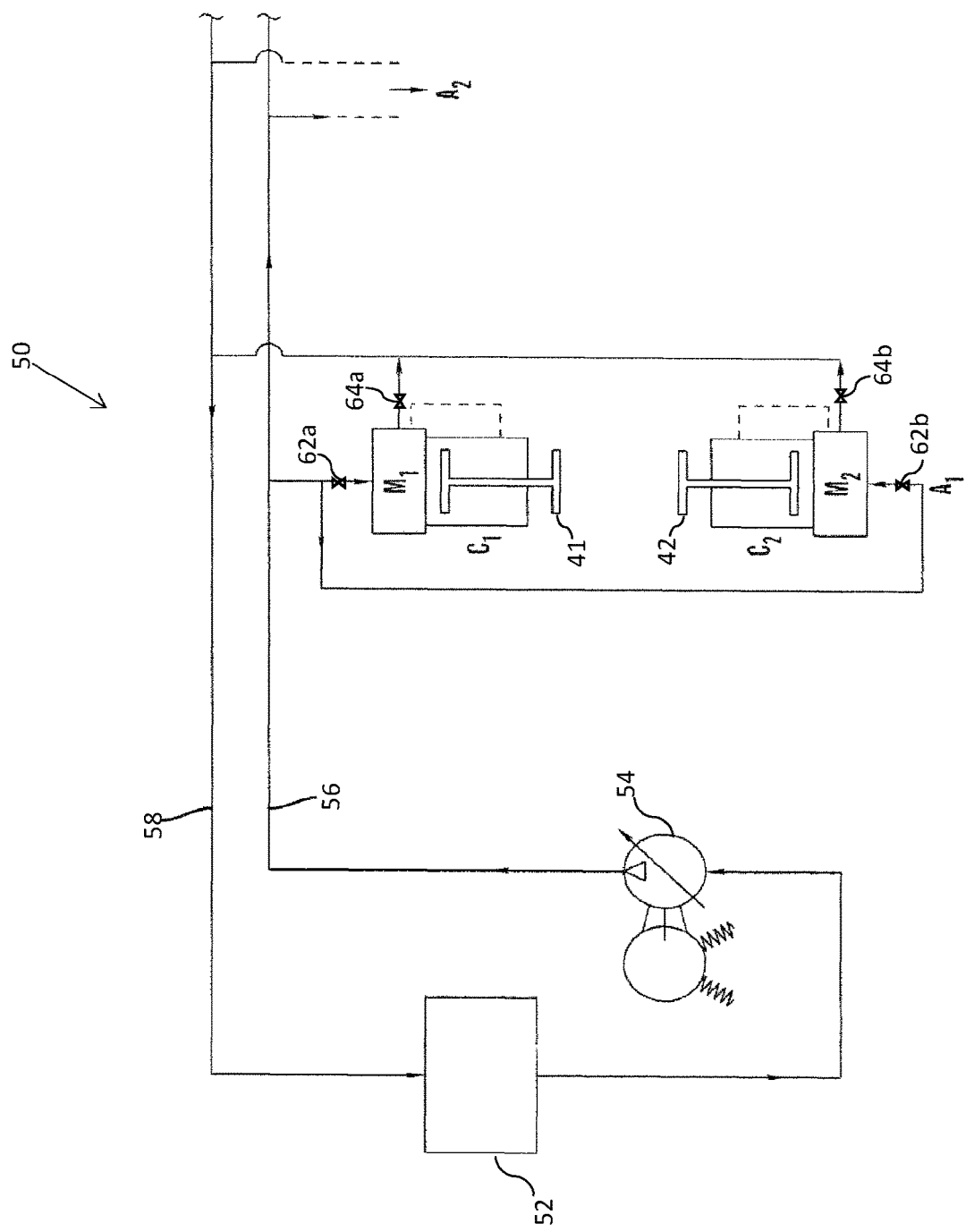
FIG. 8 is a schematic representation of a driving system according to one implementation of the described system.

FIG. 7 shows part of another exemplary base mold 700 of a heatable mold in accordance with an embodiment of the present invention.

The base mold 700 may also include various features for attachment to punch elements and/or insulation plate, such as bolt openings 702, 704, and 705, anchoring holes 706 and 708. A surface cavity 714 substantially of a diamond shape is created in the base mold 700. The surface cavity may extend to opposite sides of the base mold 700 by way of trenches 710 and 712.

As may be appreciated by those skilled in the art, the exemplary surface cavities illustrated in FIGS. 6-7 may be configured in other shapes and profiles with different dimensions depending on the characteristics of the base mold as well as the desired heat/temperature distribution to be achieved with the surface cavities. According to some embodiments of the present invention, the exact shape or profile of a surface cavity may be determined empirically, for example, by experimenting through trial and error. According to other embodiments of the present invention, the exact shape or profile of a surface cavity may be determined through computer simulation, for example, by trying and adjusting the surface cavity in a finite element analysis (FEA) program or the like and computing the resulting thermal conduction performance or temperature distribution.

In order to address various issues and advance the art, the entirety of this application (including the Cover Page, Title, Headings, Field, Background, Summary, Brief Description of the Drawings, Detailed Description, Claims, Abstract, Figures, Appendices and/or otherwise) shows, by way of illustration, various exemplary embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. That alternative embodiments may not have been presented for a specific portion of the innovations or that further undescribed alternative embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized, and functional, logical, operational, organizational, structural and/or topological modifications may be made without departing from the scope and/or spirit of the disclosure. Thus, all examples and/or embodiments are deemed to be non-limiting throughout this disclosure. Also, no inference should be drawn regarding those embodiments discussed herein relative to those not discussed herein other than it is as such for purposes of reducing space and repetition. In addition, the disclosure includes other innovations not presently claimed. Applicant reserves all rights in those presently unclaimed innovations, including the right to claim such innovations, file additional applications, continuations, continuations-in-part, divisions, and/or the like thereof.

What is claimed is:

1. A pressure-molding apparatus for making a food product, comprising:
    at least one heatable mold which defines a mold cavity and has at least one movable mold element;
    a driving system coupled to the at least one movable mold element and configured to move the at least one movable mold element relative to the mold cavity;
    a heater plate having a transverse direction and configured to provide heat across the entire transverse direction toward at least one base mold that is sandwiched between the heater plate and punches that are configured to contact raw material, wherein the at least one base mold has a first surface with at least two peripheral edges abutting the heater plate and including at least one surface cavity of a defined geometry that is centrally located and facing the heater plate and configured to promote a uniform distribution of heat across said at least one base mold;
    a raw material supply system that transports the raw material into the mold cavity; and
    a control unit configured to control at least one of said driving system, said at least one heatable mold, and said raw material supply system to process said raw material into a puffed food product.

2. The apparatus according to claim 1, wherein said control unit is further configured to:
    (a) cause said raw material supply system to deposit a raw material into said mold cavity;
    (b) actuate said driving system to position said at least one movable mold element with respect to said mold cavity to compress said raw material;
    (c) heat at least a portion of said at least one heatable mold to bake said compressed raw material at a first temperature;
    (d) actuate said driving system to at least partially retract said at least one movable mold element to allow said baked, compressed raw material to expand and take shape into a first intermediate food product;
    (e) actuate said driving system to re-position said at least one movable mold element with respect to said mold cavity to compress said first intermediate food product;
    (f) heat at least a portion of said at least one heatable mold to bake said first intermediate food product at a second temperature; and
    (g) actuate said driving system to at least partially retract said at least one movable mold element to allow said baked, compressed first intermediate food product to expand and take shape into a second intermediate food product;
    wherein at least one of Steps (c) and (f) comprises baking with the heater plate.

3. The apparatus according to claim 2, wherein said second intermediate food product is retrieved from said at least one heatable mold as a final food product.

4. The apparatus according to claim 2, wherein said first temperature is the same as said second temperature.

5. The apparatus according to claim 2, wherein said control unit is further configured to:

(h) actuate said driving system to re-position said at least one movable mold element with respect to said mold cavity to compress said second intermediate food product.

6. The apparatus according to claim 1, wherein said at least one heatable mold further comprises a ring mold element, said ring mold element slidably receives said at least one mold element in a fluid-tight manner.

7. The apparatus according to claim 1, wherein said driving system comprises:
    a fluid reservoir;
    a pump;
    a feed line connected to the pump and the fluid reservoir;
    a return line connected to the fluid reservoir;
    at least one hydraulic cylinder connected to the feed line and to the return line, the hydraulic cylinder being connected to and moving said at least one movable mold element relative to the mold cavity;
    a plurality of valves including at least one feed valve connected in the feed line and at least one return valve connected in the return line; and
    a unit that controls the operation of the feed and return valves to control the flow of fluid to the hydraulic cylinder and back to the reservoir.

8. The apparatus according to claim 1, further comprising at least one channel cavity extending from the at least one surface cavity to and terminating at a peripheral edge of the base mold.

9. A system for making a food product, comprising:
    one or more pressure-molding apparatuses, each of the pressure-molding apparatuses including:
        at least one heatable mold which defines a mold cavity and has at least one movable mold element;
        a driving system coupled to the at least one movable mold element and configured to move the at least one movable mold element relative to the mold cavity;
        a heater plate having a transverse direction and configured to provide heat across the entire transverse direction toward at least one base mold that is sandwiched between the heater plate and punches that are configured to contact raw material, wherein the at least one base mold has a first surface with at least two peripheral edges abutting the heater plate and including at least one surface cavity of a defined geometry that is centrally located and facing the heater plate and configured to promote a uniform distribution of heat across said at least one base mold;
        a raw material supply system that transports the raw material into the mold cavity; and
        a control unit configured to control at least one of said driving system, said at least one heatable mold, and said raw material supply system to process said raw material into a puffed food product.

10. The system according to claim 9, wherein said control unit is further configured to:
    (a) cause said raw material supply system to deposit a raw material into said mold cavity;
    (b) actuate said driving system to position said at least one movable mold element with respect to said mold cavity to compress said raw material;
    (c) heat at least a portion of said at least one heatable mold to bake said compressed raw material at a first temperature;
    (d) actuate said driving system to at least partially retract said at least one movable mold element to allow said baked, compressed raw material to expand and take shape into a first intermediate food product;
(e) actuate said driving system to re-position said at least one movable mold element with respect to said mold cavity to compress said first intermediate food product;
(f) heat at least a portion of said at least one heatable mold to bake said first intermediate food product at a second temperature; and
(g) actuate said driving system to at least partially retract said at least one movable mold element to allow said baked, compressed first intermediate food product to expand and take shape into a second intermediate food product;
wherein at least one of Steps (c) and (f) comprises baking with said at least one base mold coupled to the heater plate.

11. The system according to claim 10, wherein said second intermediate food product is retrieved from said at least one heatable mold as a final food product.

12. The system according to claim 10, wherein said first temperature is the same as said second temperature.

13. The system according to claim 10, wherein said control unit is further configured to:
(h) actuate said driving system to re-position said at least one movable mold element with respect to said mold cavity to compress said second intermediate food product.

14. The system according to claim 9, wherein said at least one heatable mold further comprises a ring mold element, said ring mold element slidably receives said at least one mold element in a fluid-tight manner.

15. The system according to claim 9, further comprising at least one channel cavity extending from the at least one surface cavity to and terminating at a peripheral edge of the base mold.

* * * * *